United States Patent [19]

Kagano

[11] Patent Number: 4,913,287
[45] Date of Patent: Apr. 3, 1990

[54] TAPE CARTRIDGE CONTAINER

[75] Inventor: Sinichi Kagano, Kyoto, Japan

[73] Assignee: Hitachi Maxell, Ltd., Osaka, Japan

[21] Appl. No.: 311,853

[22] Filed: Feb. 17, 1989

[30] Foreign Application Priority Data

Feb. 19, 1988 [JP] Japan ............................ 63-21431[U]

[51] Int. Cl.⁴ .............................................. B65D 85/67
[52] U.S. Cl. ..................................... 206/387; 220/337
[58] Field of Search ................ 206/387; 220/338, 335, 220/337, 334, 342

[56] References Cited

U.S. PATENT DOCUMENTS 3,978,985  9/1976  Zinnbauer ........................... 206/387
4,757,896  7/1988  Huko ................................... 206/387

Primary Examiner—Stephen Marcus
Assistant Examiner—Jacob K. Ackun, Jr.
Attorney, Agent, or Firm—Birch, Stewart, Kolasch & Birch

[57] ABSTRACT

A tape cartridge container of the type having a container body and lid rotatably supported on the case body, the lid being provided with a pocket for accommodating a tape cartridge, an interface defined by the back edge of the bottom wall of the container and the front edge of the bottom wall defining the pocket is shaped such that, when the lid is closed, the intermediate portion of the interface in the left and right directions is slanted against a line between the pivoting axes for supporting the lid linearly or arcuately and the lengths at the left half portion and right half portion of the bottom wall of the case body in the front and back directions are different, whereby bending at the intermediate portion of the bottom wall of the lid can be decreased by providing a gate for injecting molten plastic resin at that side of the cartridge where the length is longer when molding the lid and body due to improvement of the flow of the molten resin.

4 Claims, 6 Drawing Sheets

TAPE CARTRIDGE CONTAINER

BACKGROUND OF THE INVENTION

1. Field of the Invention

The present invention relates to a tape cartridge container for removably accommodating a tape cartridge.

2. Description of the Prior Art

A conventional tape cartridge container comprises a box like body 1 made of plastic resin and a lid 4 for opening and closing the body 1, as shown in FIGS. 1 to 3. The lid 4 is provided with a pocket 13 for removably inserting a tape cartridge A and an index card B on one side or inner surface of the lid 4 (hereinafter referred to as the back side of the lid) and the lid 4 is rotatably supported by pivoting axes 2 and 3 between side extension walls 7a and 8a projected backward from both left and right side walls 7 and 8 beyond the back side edge 5a of a bottom wall 5 of the box like body 1.

As shown in FIG. 2, when the lid 4 is closed, the back side edge 5a of the bottom 5 of the body 1 is adapted to abut on the front edge 18a of a bottom wall 18 of the pocket 13 in the same plane of the bottom wall 5 of the body 1 along a line which is parallel with the line S connecting the pivoting axes 2 and 3 across the entire length of the longitudinal direction or left and right directions of the body 1.

In the arrangement of the conventional cartridge container as mentioned above, there may occur such a drawback that the lid 4 can not rotate smoothly against the body 1 by the reason mentioned below. Since the body 1 is made of a plastic resin molding, the back side edge 5a tends to be bent, as shown by the dotted lines F in FIG. 3. The bending is often greatest in the direction toward the inside of the body 1 at the intermediate portion of the back side edge 5a. Therefore, when the lid 4 is rotated relative to the body 1, the front edge 18a of the bottom wall 18 of the pocket 13 unduly engages with the deformed back side edge 5a, whereby a smooth rotation of the lid and body is impeded.

In order to improve the problem mentioned above, it is proposed to provide a gap between the back side edge 5a of the bottom wall 5 of the body 1 and the front edge 18a of the bottom wall 18 of the pocket 13 so as to avoid the undue engagement of the deformed back side edge 5a of the bottom wall 5. However, such arrangement is undesirable because a large gap between the back side edge 5a and the front edge 18a allows dust or the like to enter into the interior of the container.

There is proposed another arrangement whereby the front edge 18a of the bottom wall 18 of the pocket 13 of the lid 4 is bent inwardly beyond the back side edge 5a of the bottom wall 5 of the body 1. However, this arrangement may invite a problem whereby the inside space of the pocket 13 is narrowed if the amount of the bending of front edge 18a is large such that it becomes difficult to insert or withdrawn the tape cartridge A and/or the index card B into or from the pocket 13.

SUMMARY OF THE INVENTION

Therefore, an essential object of the present invention in a cartridge container of the type having a body and a lid with a is to prevent either the deformation of the bottom wall of the body of the container and/or the deformation of the bottom wall of the pocket so as to improve the operability of opening and closing the lid and body of the container.

Another object of the present invention is to provide sufficient space in the pocket to accommodate the tape cartridge and index card even when the improvement mentioned above is embodied.

The present invention is characterized in the shape of an interface between the back edge of the bottom wall of the pocket of the lid and the front edge of the bottom wall of the body.

The interface 19 is shaped such that, when the lid 4 is closed, the back edge 5a of the bottom wall 5 and front edge 18a of the bottom wall 18 are in a facing relationship at the interface 19 and at least the intermediate portion of the interface 19 in the left and right directions is slanted against a line S between the pivoting axes 2 and 3 linearly or arcuatedly and the lengths 11 and 12 at the left half portion and right half portion of the bottom walls 18 and 5 in the front and back directions are different.

In the arrangement of the present invention, a gate for injecting molten plastic resin is provided at the side where the length 11 or 12 is longest when each of the lid and body is molded. The flow of the molten resin is improved and dispersion of the cooling effect of the molded lid and body with respect to the left and right directions at the back edge 5a and/or front edge 18a with respect to the left and right directions realized, particularly at the intermediate portion in the left and right directions, where the effect of the bending of the bottom walls 5 and 18 can be decreased and concentration of such bending can be avoided.

DETAILED DESCRIPTION OF THE INVENTION

Figure 5:
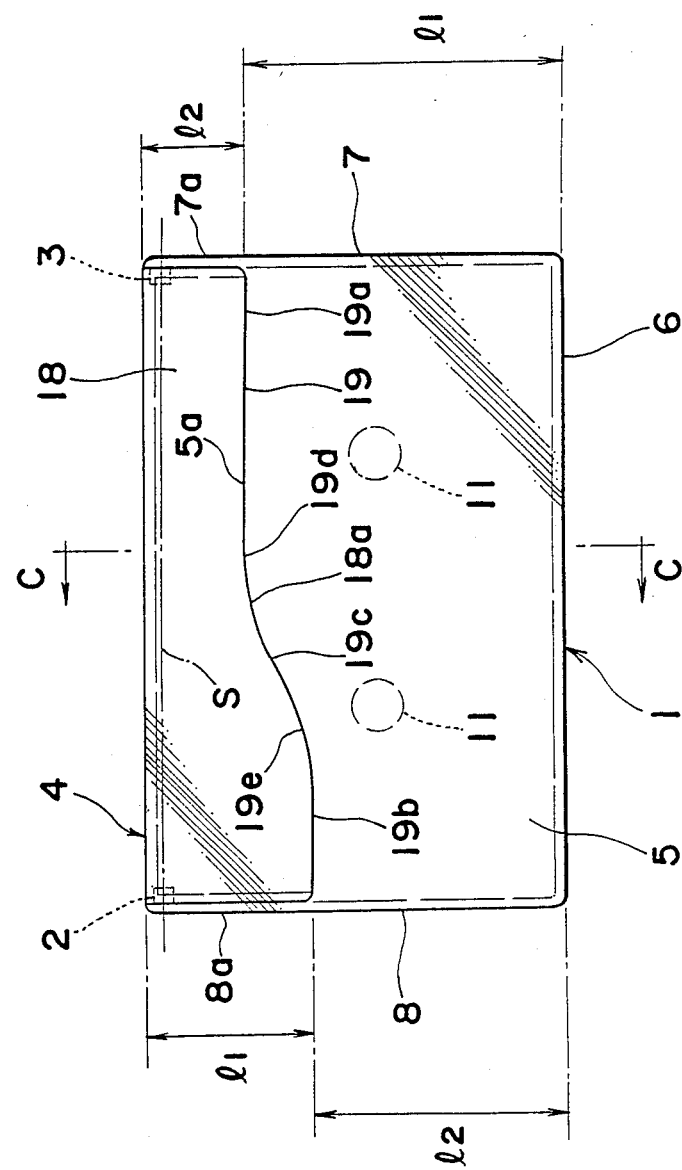
FIG. 5 is a bottom plan view showing a container according to the present invention.
Figure 6:
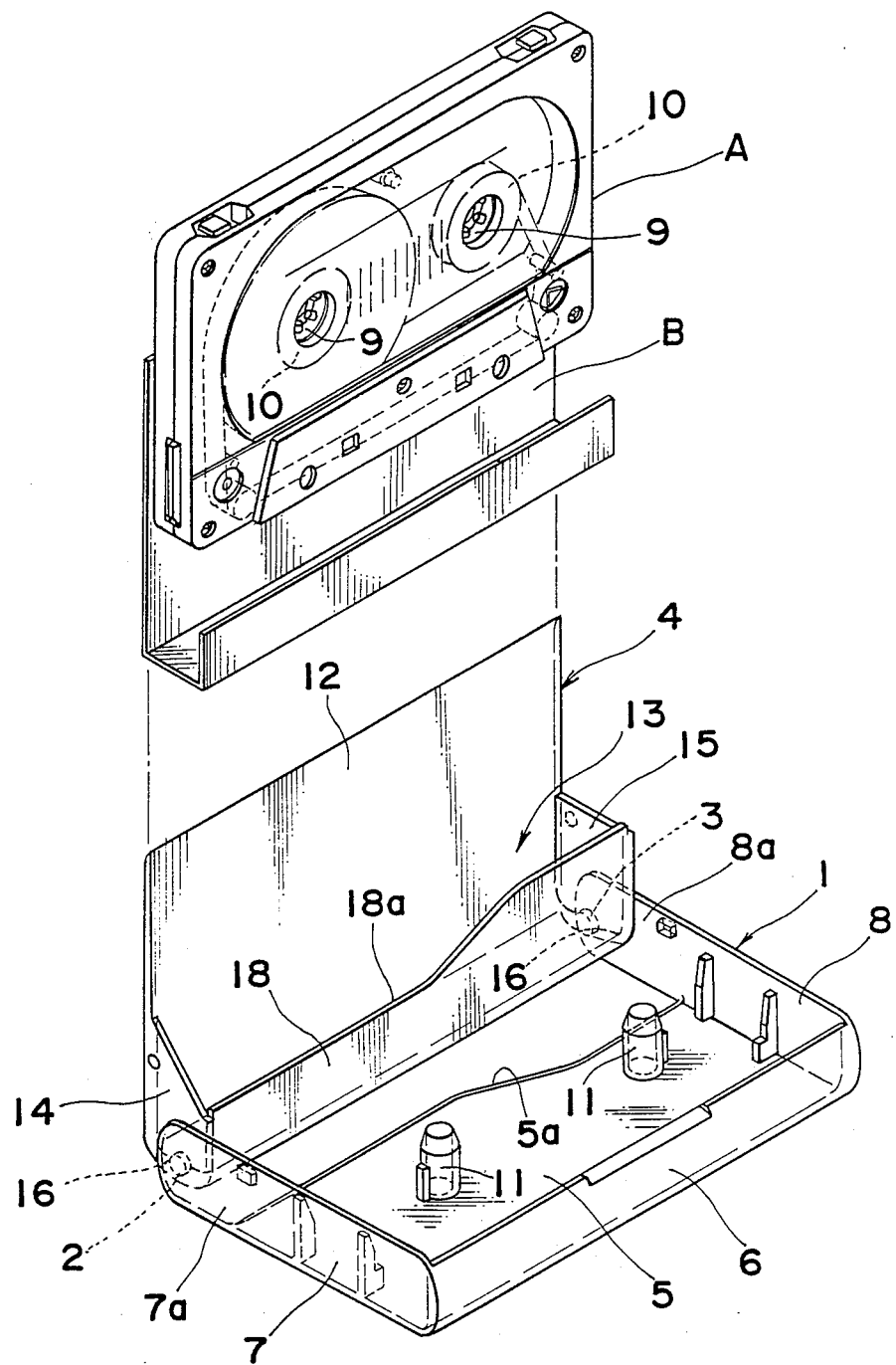
FIG. 6 is a perspective view showing an embodiment of the container according to the present invention.

Referring to FIGS. 5 and 6, the cartridge container according to the present invention is provided with the body 1 made of plastic resin and the lid 4 made of plastic resin and rotatably supported around the pivoting axes 2 and 3. The body 1 is provided with a front wall 6, the left side wall 7 and the right side wall 8 projected from the front edge and both left and right edges of the bottom wall 5 of the body 1. There is projected from the inside of the bottom wall 5 a pair of rotation preventing bosses 11 which are engageable with a pair of hubs 10 of the tape cartridge A through a pair of drive shaft insertion holes 9.

The lid 4 is provided with the pocket 13 on the back side or inner surface of the top wall 12 for removably inserting the tape cartridge A and index card B from the front. Left and right side walls 14 and 15 of the pocket 13 are fitted between the side extension walls 7a and 8a of the left and right side walls 7 and 8 extending backward from the back edges 5a of the bottom wall 5 off the body 1 by inserting the pivoting axes 2 and 3 projected from the side extension walls 7a and 8a into pivoting holes 16 defines at the back end portions of the left wall 14 and right wall 15 respectively, the lid 4 and the body 1 being relatively movably pivoted around the pivoting axes 2 and 3.

Figure 7:
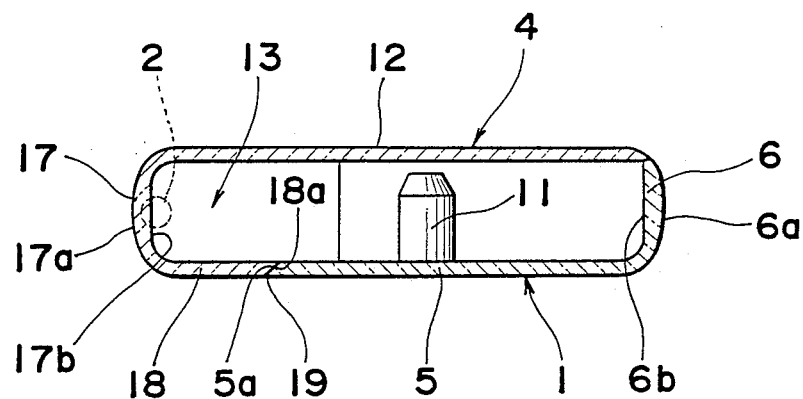
FIG. 7 is a cross sectional view taken along the lines C—C in FIG. 5.

FIG. 7 shows a cross sectional shape of the front wall 6 of the body 1 and back wall 17 of the pocket 13 of the lid 4, wherein the outer face 6a of the front wall 6 and the outer face 17a of the back wall 17 are respectively formed in an arcuated shape with the inner faces 6b and 17b formed as straight walls. By forming the outer surfaces 6a and 17a in the round shape over the entire length in the left and right directions of the container, the lid 4 can be opened by a soft touch without fear of injury to the operator when the operator engages his finger with the front wall 6 and/or back wall 17. Also, to form the walls 6 and 17 in a round arcuate shape is advantageous because the wrapping sheet is prevented from being broken when the container is wrapped. In addition, by making the walls 6 and 17 in round a shape, the mechanical strength of the walls 6 and 17 can be reinforced and deformation of the walls 6 and 17 can be avoided. Moreover, the flow of the molten resin at the time of molding can be improved and the molding property enhanced. Moreover, the back wall 17 can act as a convex lens to enlarge the characters shown on the index card B stored in the pocket 13, so that it facilitates reading the characters on the index card B.

The end portions of the side extension walls 7a and 8a are also shaped in a round shape conforming to the round shape of the back wall 17.

In the bottom of the container, the back edge 5a of the bottom wall 5 of the body 1 and the front edge 18a of the bottom wall 18 of the pocket 13 abut together in the same plane when the lid 4 is closed, the shape of the abutting interface 19 being unique according to the present invention The interface 19 shown in FIG. 5 is shaped in such a manner that the left hand portion and the right hand portion are shaped by straight parallel lines 19a and 19b staggered in the front back directions and the right end of the left hand portion 19a is connected to the left end of the right hand portion 19b through curved portions 19d and 19e connected by a slanted linear portion 19c. The straight lines 19a and 19b are parallel to the line S connecting the pivoting axes 2 and 3 and the line 19c is slanted to the line S.

Figure 8:
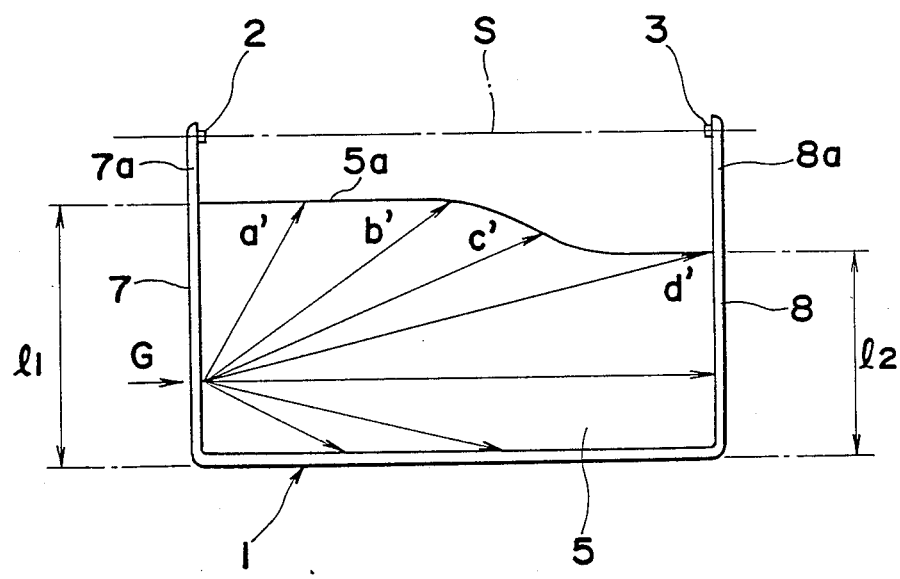
FIG. 8 is a schematic diagram showing the flow of molten resin when the container according to the present invention is molded.

When the body 1 is injected molded, as shown in FIG. 8, a gate G is set at the side where the length l1 of the distance between the interface 19 and the front edge of the body 1 is longer than the length l2. Similarly the gate for molding the lid 4 was set at the right side where the bottom wall in the front and back direction is longer and the body 1 and the lid 4 were molded using the gates G mentioned above. By the arrangement, the flow of the molten resin was much improved and there could be obtained a container in which the deformation of the body 1 and lid 4 is minimized.

Figure 1:
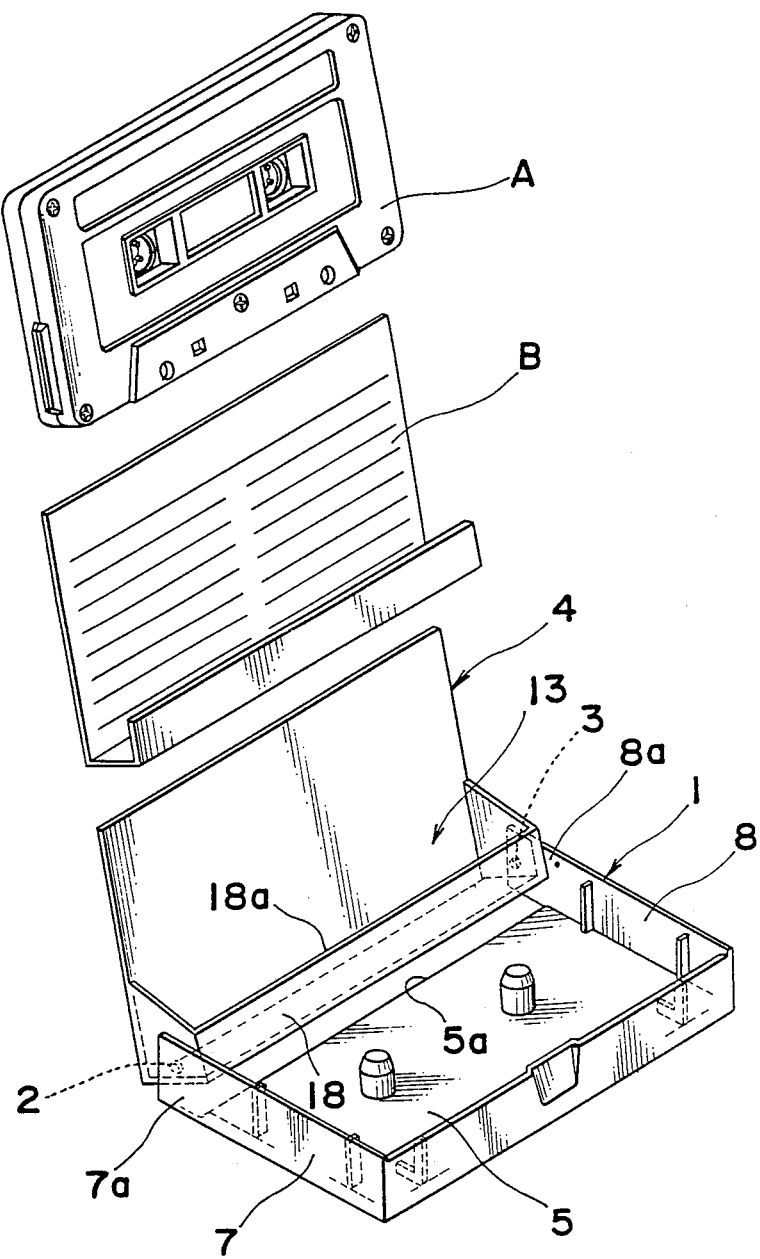
FIG. 1 is a perspective view showing a conventional container for containing a tape cartridge.
Figure 2:
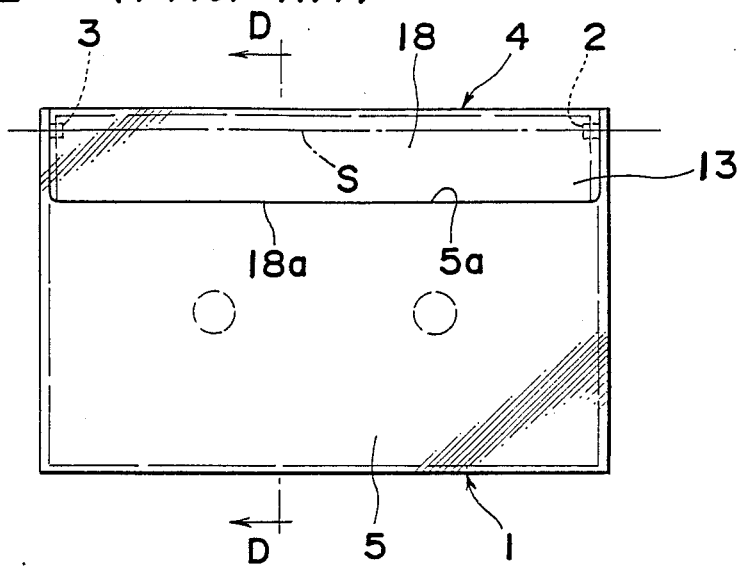
FIG. 2 is a bottom plan view of the container shown in FIG. 1.
Figure 3:
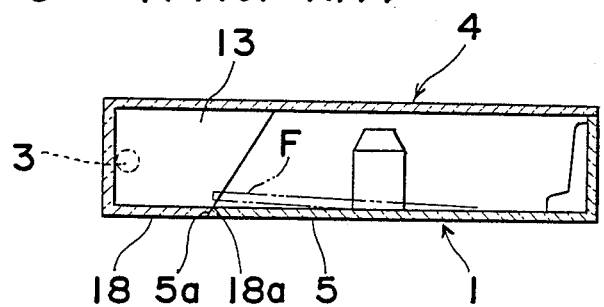
FIG. 3 is a cross sectional view taken along the lines D—D in FIG. 2.
Figure 4:
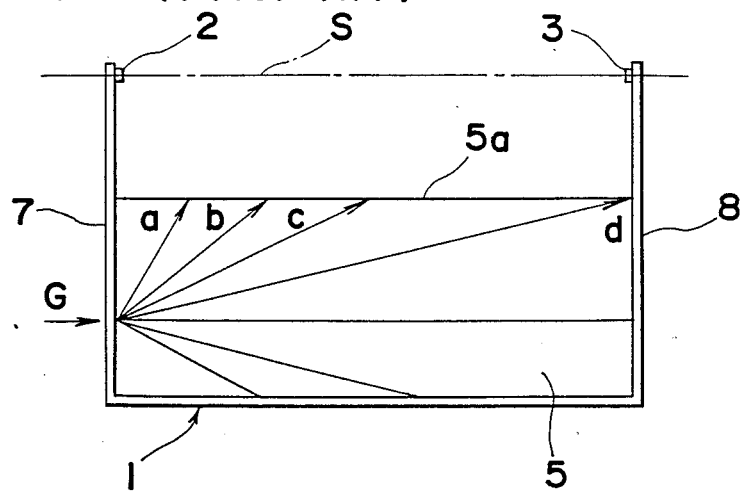
FIG. 4 is a schematic diagram showing the flow of molten resin when the prior art container is molded.

FIG. 8 shows the flow of the molten resin at the time of the molding of the body 1 having a bottom wall 5 with the back edge 5a as mentioned above and FIG. 4 shows flow of the molten resin at the time of molding the conventional container in which the back edge 5a of the bottom wall 5 is a straight line parallel to the axis line S. In the case when the gate G is set at the left side wall 7 of the body 1, the molten resin injected from the gate G flows in the directions radially as shown by arrows a, b, c and d the lengths of the arrows are all different, and the different in the lengths of the arrows a and d is largest. To the contrary, in the embodiment according to the present invention as shown in FIG. 8, the difference between the lengths of the arrows b' and c' is small and the difference in the lengths between the arrows a' and d' is smaller than that of the conventional one. Therefore, the difference in the cooling conditions at the various positions of the bottom wall 5 of the body 1 according to the present invention is decreased so that the deformation of the bottom 5 at the back edge 5a is small.

Figure 9:
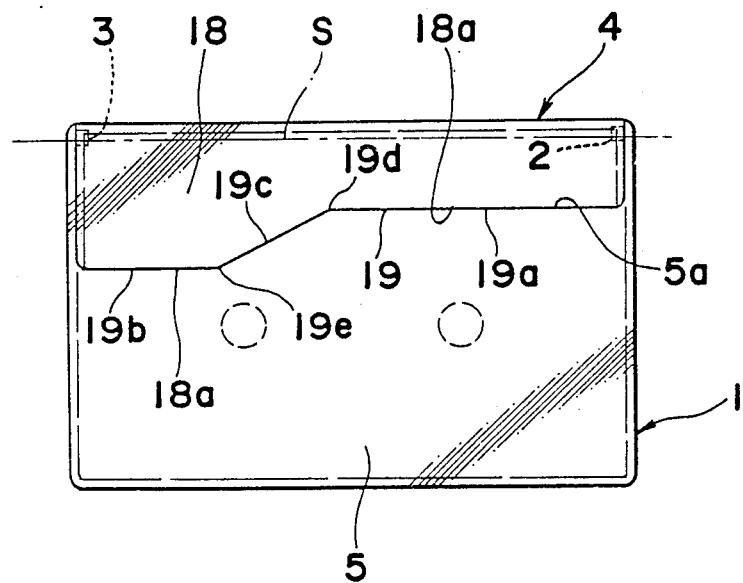
FIG. 9 is a bottom plan view of another embodiment of the container according to the present invention.

FIG. 9 shows another embodiment of the container according to the present invention where the body 1 and lid 4 are shaped in the same manner as those of the embodiment shown in FIG. 5 except that the lines 19a and 19b are connected by a straight line 19c without curved portions 19d and 19e.

Figure 10:
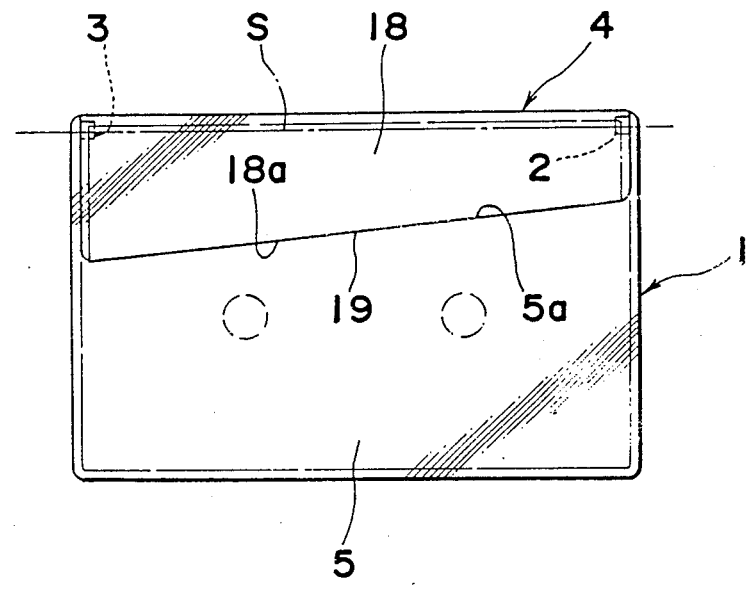
FIG. 10 is a bottom plan view of a further embodiment of the container according to the present invention.

FIG. 10 shows a further embodiment of the container according to the present invention wherein the body 1 and the lid 4 is shaped in the same manner as those of the embodiment shown in FIG. 5 except that the interface 19 is shaped only on the slanted straight line 19 which is slanted against the axis line S connecting axes 2 and 3.

The cartridge which is stored in the container according to the present invention may not be limited to the audio tape cartridge but may also be, for example a video tape cartridge. In addition, it is not essential to provide the bosses 11.

As mentioned above, according to the present invention, at the abutting interface 19 where the back edge 5a of the bottom wall 5 of the body 1 abuts or faces to the front edge 18a of the bottom wall 18 of the pocket 13, at least at the intermediate portion of the interface 19 the back edge 5a and the front edge 18a are formed in such a manner that the interface 19 between the edges 5a and 18a is slanted relative to a line connecting the pivoting axes 2 and 3 and moreover the lengths of the respective bottom walls 5 and 18 in the frontward and backward directions are made different at the left half portion and the right half portion of the container. Accordingly, at the interface 19 between the back edge 5a and the front edge 18a, it is possible to prevent the bottom wall 5 from being bent and even if such bending occurs, the amount of the bending can be minimized, whereby the opening and closing movements of the lid 5 relative to the body 1 can be made smoothly. By decreasing the amount of bending of the bottom walls 5 at the back edge 5a and the bottom wall 18 at the front edge 18a, it is further advantageous that the gap between the back edge 5a and the front edge 18a at the interface 19 can be decreased so that entrance of dust or the like through the gap is prevented. Moreover, it is advantageous to assure a sufficient space for accommodating the tape cartridge A and index card B in the pocket 13 by decreasing the amount of the bending of the bottom walls 5 and 18 at the back edge 5a and the front edge 18a.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A tape cartridge container for removably containing at least one tape cartridge which comprises a body formed of a bottom wall having a front wall and left and right walls projecting from three edges of said bottom wall and a lid formed of a top wall having a pocket consisting of two side walls and a bottom wall provided at a back portion of an inner surface of said lid for removably accommodating and supporting a back portion of said tape cartridge which is inserted from a front of the pocket, said lid being rotatably supported on said body in such a manner that a back portion of said lid is supported by pivoting axes between a pair of left and right walls extending backward from said left and right walls of said body beyond a back edge of said bottom wall of the said body, said back edge of said bottom wall of said body being faced to a front edge of said bottom wall of said pocket, both of said bottom walls of said body and said pocket of said lid being shaped so that when said lid is closed said back edge of said bottom wall of said body and said front edge of said bottom wall of said pocket are faced so as to define an interface, at least an intermediate portion of said interface, from the left to the right direction, being slanted with respect to a line S between said pivoting axes and wherein lengths l1 and l2 representing the left half portion and right half portion of said bottom walls of each of said body and pocket of said lid respectively in a front to rear direction are different.

2. The container according to claim 1, wherein the shape of said interface is such that both left and right end portions respectively on either side of said intermediate portion of said interface representing the back edge of said bottom wall of said body and front edge of said bottom wall of said pocket are formed by straight lines in parallel with said line S connecting said pivoting axes and said lines are connected by said intermediate portions in the shape of a straight, slanted line.

3. The container according to claim 1, wherein the shape of said interface is such that both left and right end portions respectively on either side of said intermediate portion of said interface representing the back edge of said bottom wall of said body and front edge of said bottom wall of said pocket are formed by straight lines in parallel with said line S connecting said pivoting axes and said lines are connected by said intermediate portions in the shape of a curved line.

4. The container according to claim 1, wherein the shape of said interface is a straight line slanted with respect to said line S connecting said pivoting axes.

* * * * *